UNITED STATES PATENT OFFICE.

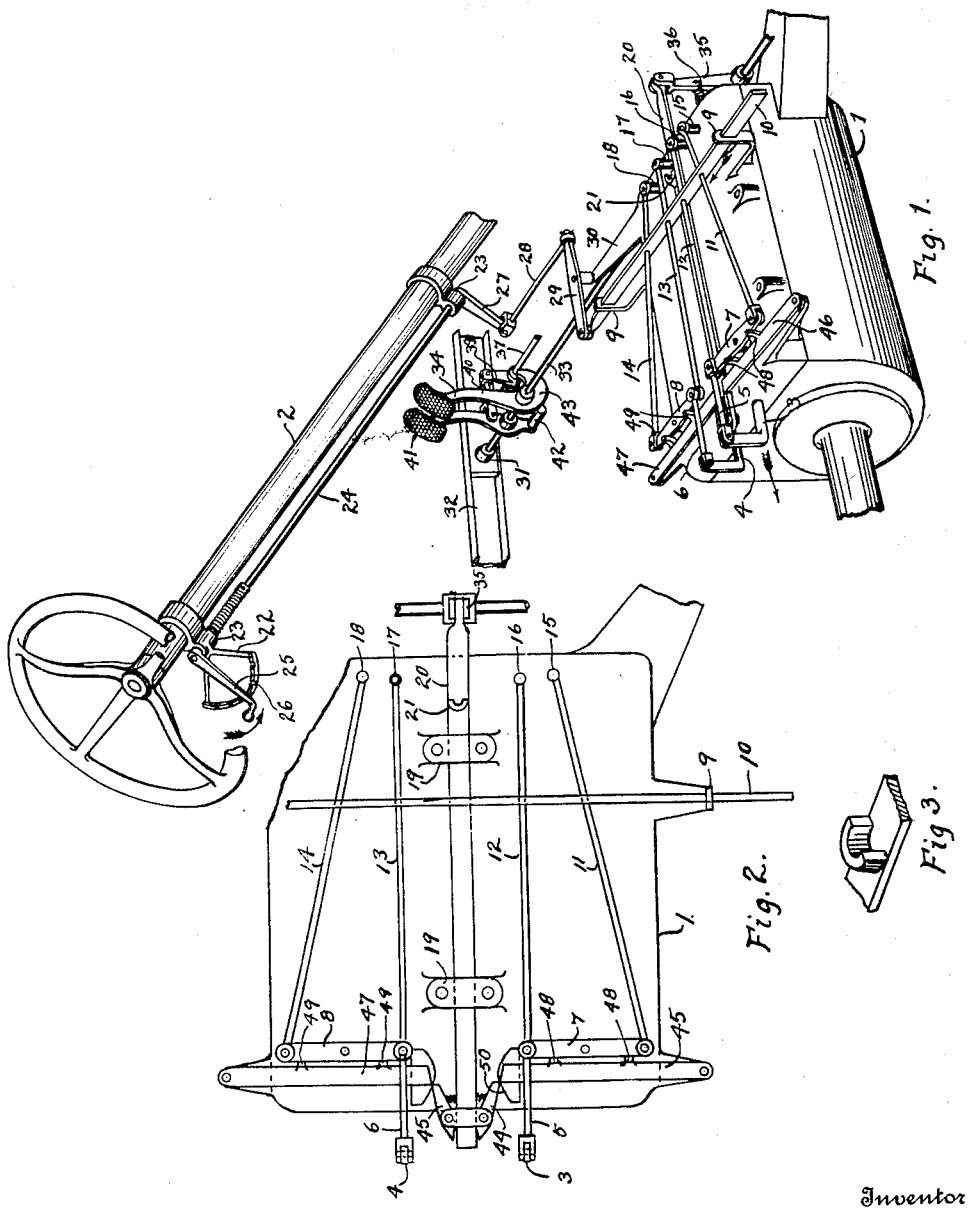

WALTER F. MOTTIER, OF EL CAMPO, TEXAS.

CLUTCH AND TRANSMISSION MECHANISM.

1,377,498.  Specification of Letters Patent.  Patented May 10, 1921.

Application filed February 18, 1919. Serial No. 277,800.

*To all whom it may concern:*

Be it known that I, WALTER F. MOTTIER, a citizen of the United States, residing at El Campo, in the county of Wharton and State of Texas, have invented certain new and useful Improvements in a Clutch and Transmission Mechanism, of which the following is a specification.

This invention relates to new and useful improvements in a clutch and transmission mechanism.

One object of the invention is to provide a mechanism of the character described, which is specially applicable to motor vehicles, and has been designed for the purpose of operating the clutch and transmission for effecting changes of speed.

Another object of the invention resides in the provision of a mechanism of the character described, through which the speed desired may be selected in advance, and the desired speed then obtained by an automatic shifting of the transmission gears, when the clutch is disengaged through the operation of the clutch controlling lever.

A further feature of the invention resides in the provision of a mechanism of the character described, whereby any speed, forward or reverse, may be selected in advance, and the mechanism set accordingly, and through which the desired speed may be obtained by the ordinary manipulation of the clutch controlling lever.

With the above and other objects in view, the invention has particular relation to certain novel features of construction, arrangement of parts and use, an example of which is given in this specification and illustrated in the accompanying drawings, wherein:

Figure 1, is a perspective view of the device, as applied to the clutch and transmission of a motor vehicle.

Fig. 2, is an enlarged fragmentary plan view thereof.

Fig. 3, is a fragmentary perspective view of the actuating rod employed, and

Figure 4:
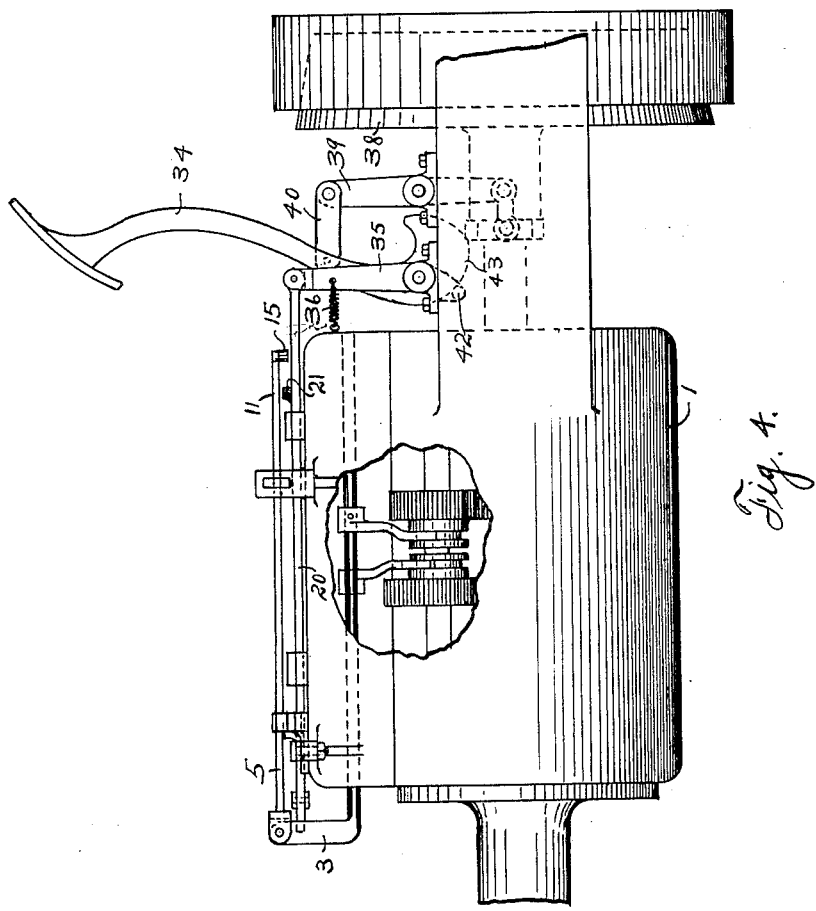
Fig. 4, is a side view of the transmission mechanism and clutch showing my improved device applied thereto.

Referring now more particularly to the drawings, wherein like numerals of reference designate similar parts in each of figures, the numeral 1, refers to the transmission case provided to inclose any conventional form of transmission mechanism, and the numeral 2 refers to the steering column.

Mounted in the transmission case, are the usual gear shifting rods 3 and 4, provision being thus made for shifting the transmission gears, into reverse or low, intermediate and high speed ahead. The outer ends of the gear shifting rods 3 and 4 are upturned, and the respective links 5 and 6 are pivoted at one end to said upturned ends, said links being pivoted at their other ends to the inner ends of the respective levers 7 and 8, said levers being pivoted at intermediate points to the top of the transmission case. Slidably mounted in transversely alined bearings 9, 9, carried by the transmission case, there is a transverse transfer bar 10. In the form shown, there are four actuating rods 11, 12, 13 and 14, the rods 11 and 12 being pivoted at one end to the respective ends of the lever 7, and the rods 13 and 14, being pivoted at one end to the respective ends of the lever 8. These rods pass through bearings in the transfer bar 10, and their free ends carry depending studs 15, 16, 17 and 18. Slidably mounted in a suitable bearing 19, carried by the transmission case, there is an actuating bar 20, whose upper side carries the arcuate lug 21, formed to engage with the respective studs of the actuating rods, in the manner and for the purpose hereinafter set forth. Fixed at a convenient place, preferably to the upper end of the steering column, there is a segmental rack member 22, and rotatably mounted in the bearings 23, 23, carried by said column, there is a manual rod 24, whose upper end is provided with a manual lever 25, which is fixed thereto, and which is formed to engage in the spaced notches 26, of the rack member 22. The lower end of the rod 24 is formed with a laterally extending arm 27, to the free end of which, the link 28 is pivoted at one end. The other end of this link is connected to one end of the lever 29, said lever being pivoted at an intermediate point to the laterally extending arm 30, of the transmission case, and the other end of this lever 29 is connected to and actuates the transfer bar 10. Rotatably mounted in suitable bearings, as 31, carried by the side members 32, of the vehicle frame, there is a transverse shaft 33, to which the foot pedal 34 is fixed. This shaft 33 has the upstanding arm 35, fixed thereto, whose upper end is pivoted to the front end of the actuating bar 20, and a strong pull spring 36 is attached at one end to the arm 35, and at its other end to the adjacent end of the transmission case. The numeral 37, designates a transverse shaft which is operatively connected with the clutch 38, and through which said clutch may be released. This shaft is rotatably mounted in suitable bearings carried by the vehicle frame, and has the upstanding arm fixed thereto, whose free end is connected through the link 40, with the foot pedal 41. This last mentioned pedal is loosely mounted on the shaft 33, and through its manipulation, the clutch may be disengaged. The lower end of the pedal 41 has the laterally extending stud 42, which rides against the cam 43, into which the lower end of the pedal 34 is formed.

As shown in Figs. 1 and 2, the device is in neutral. If it be desired to now shift the transmission to low speed ahead, and assuming that a rearward movement of the gear shifting rod 3 will accomplish this result, the manual lever 25 may be moved two notches to the right, which will operate through the mechanism described, to shift the transfer bar 10, to the left, as indicated by the arrow in Fig. 1, thus carrying the stud 15 into the path of the arcuate lug 21. The mechanism is thus set in position to shift the transmission mechanism to the selected speed. The pedal 34 is now depressed with the result that the cam 43 will operate against the stud 42, transmitting a partial rotation to the clutch actuating shaft 37, thus disengaging the clutch, and the cam 43 is so formed that said clutch will be held disengaged through the further movement of the pedal 34. This further movement of said pedal will operate to continue the rotation of the shaft 33, exerting a forward pull through the arm 35, upon the actuating bar 20, causing the lug 21 to engage with the opposing stud 15, and carry the same forwardly, thus operating through the actuating rod 11, the lever 7, and the link 5, to carry the gear shifting rod 3 rearwardly, and shifting the transmission gears to low speed ahead. The pedal 34 is now released, and the pull spring 36 will operate to restore the actuating bar 20 back to its original position. The lever 7 and rod 11, however, remain in position, as indicated in dotted lines in Fig. 2. When it is desired to again change speed, the manual lever 25 is shifted, according to the speed selected, carrying the corresponding stud, required to accomplish the desired speed, into the path of the lug 21, and the pedal 34 is again depressed, again moving the actuating bar 20 forwardly. The rear end of this actuating bar 20 carries the oppositely disposed pivoted spring seated dogs 44 and 45, and pivoted at their outer ends to the transmission case, are the levers 46 and 47, carrying the upstanding spaced lugs 48, 48 and 49, 49. When the actuating bar 20 now moves forwardly, the dog 44 engages against the inner end of the lever 45, and moves the same forwardly, the lugs 48, engaging against the lever 7, and carrying it to its original neutral position as shown in Fig. 1, and the said dog 44 is now depressed by coming into contact with the cam 50, which upstands from the crank case and said dog is thereby disengaged from the lever 45, permitting the actuating bar 20 to continue its forward movement, and to engage with the stud shifted into alinement therewith, thus actuating the corresponding gear shifting rod 3 or 4, as the case may be, and effecting the required change of gear ratio.

It is obvious that other changes of speed may be obtained by a suitable manipulation of the manual lever 25, in a similar manner to that above described.

When it is desired to shift the transmission mechanism to neutral position only, this is accomplished by setting the manual lever 25 at a point midway between any two of the notches 26, and when so set, none of the studs of the actuating rods will be in the path of the lug 21. When the pedal 34 is then depressed, the actuating bar 20 will be moved forwardly, operating to bring the transmission mechanism to neutral position as above described, and as the bar 20 continues to move forwardly, the lug 21 will pass between the studs of the actuating rods without further influencing the transmission gears.

What I claim is:

1. In a motor vehicle the combination with a clutch, of a transmission mechanism through which power may be transmitted from the motor at variable rates of speed; a speed selective device adapted, when actuated, to effect changes in the gear ratio; said device including gear shifting members connected to the transmission gears, a transfer mechanism and a manually controlled mechanism through which said transfer mechanism may be shifted to adjust either of said members to a selected position; a clutch actuating means; an actuating device connected to, and actuated by, said means, through which the selected member is actuated to shift the corresponding transmission gear.

2. In a motor vehicle, the combination with a clutch, of a transmission mechanism through which power may be transmitted from the motor at variable rates of speed, a speed selective device adapted, when actuated, to effect changes in the gear ratio, said device including gear shifting members connected to the transmission gears, a transfer mechanism and a manually controlled mechanism through which said transfer mechanism may be shifted to adjust either of said members to a selected position, a clutch actuating means, an actuating device connected to, and actuated by, said means, through which the selected member is actuated to shift the corresponding transmission gear, and means actuated by the actuating device and operating to restore the transmission mechanism to neutral position prior to its actuation by said selective device.

In testimony whereof I have signed my name to this specification in the presence of two subscribing witnesses.

WALTER F. MOTTIER.

Witnesses:
E. V. HARDWAY,
IRENE I. BRUNS.